G. F. DICKSON.
CANDY MACHINE.
APPLICATION FILED SEPT. 10, 1909.
948,969.
Patented Feb. 8, 1910.
2 SHEETS—SHEET 1.
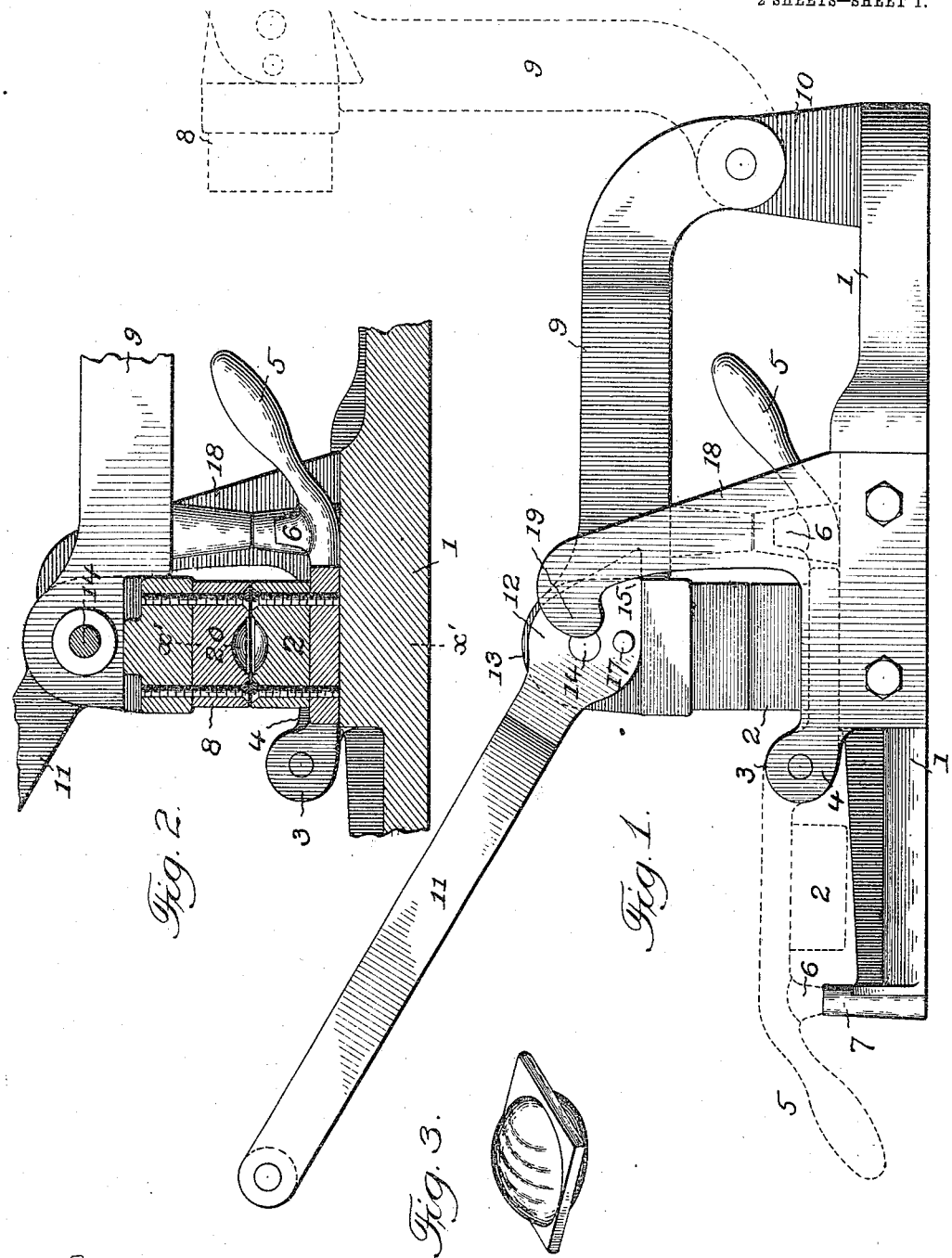
Attest:
John Enders
Henry Moe
Inventor:
George F. Dickson,
by Robert Burns
Attorney

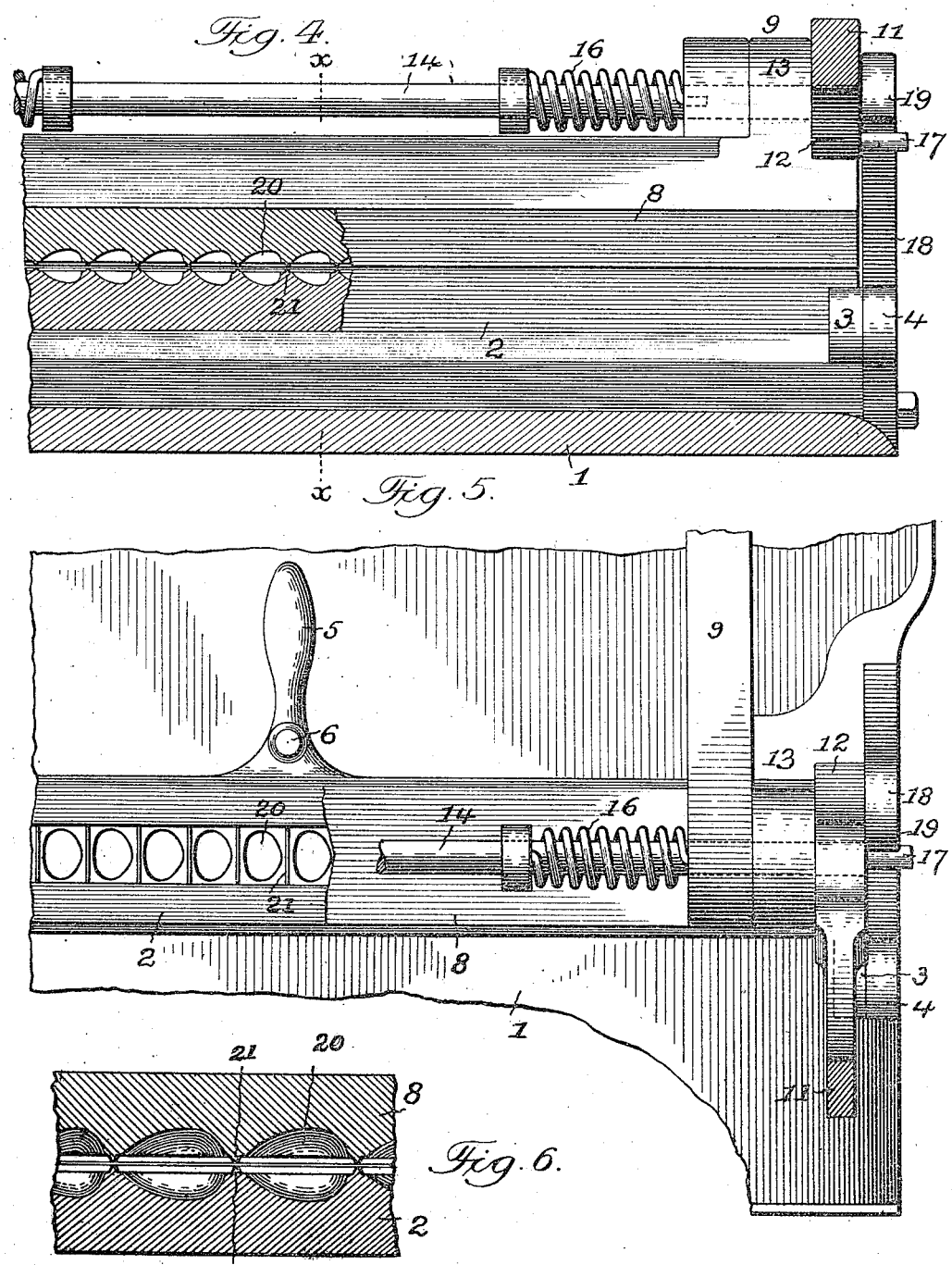

UNITED STATES PATENT OFFICE.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

CANDY-MACHINE.

948,969.  Specification of Letters Patent.  Patented Feb. 8, 1910.

Application filed September 10, 1909. Serial No. 517,030.

*To all whom it may concern:*

Be it known that I, GEORGE F. DICKSON, a citizen of the United States of America, and a resident of Chicago, in the county of Cook and State of Illinois, have invented certain new and useful Improvements in Candy-Machines, of which the following is a specification.

This invention relates to a pressing mechanism for molding a strip of candy material into a series of pieces of candy having an ornamental or symmetrical form, and has for its object to provide a simple and efficient structural formation and combination of parts whereby a very rapid and effective molding operation is attained, and the discharge of the finished articles effected in a like rapid and certain manner, all as will hereinafter more fully appear.

In the accompanying drawings:—Figure 1, is an end elevation illustrating the general arrangement of the machine parts, and showing the different position of the same in dotted lines. Fig. 2, is a detail transverse sectional elevation on line x—x, Fig. 4. Fig. 3, is a detail perspective view of a molded piece of candy. Fig. 4, is a detail front elevation of the machine, with portions of the mold members in section. Fig. 5, is a detail plan of the machine, with superimposed portions removed to disclose lower portions of the machine. Fig. 6, is an enlarged detail longitudinal section of the mold members.

Similar numerals of reference indicate like parts in the several views.

Referring to the drawings, 1 represents the base plate of the machine, and upon the upper surface of which the respective upper and lower mold members are supported in the pivotal manner hereinafter described.

2 is the lower mold member, preferably of the detail construction hereinafter described, and which in its normal and molding position rests upon the top of the base plate 1, as illustrated in Figs. 1, 2 and 3, and is maintained in such position and in proper relation to the other coacting parts of the machine by a pivotal connection to the base plate and preferably as follows:

3, are forwardly extending ears on the mold member 2, aforesaid, and 4 are companion pivot ears on the base plate 1. Said ears are connected together by pivot pins of any usual form.

With the described arrangement of parts, the lower mold member 2 is adapted to be tilted forward, in manner illustrated in dotted lines in Fig. 1, to discharge the molded material from out of its mold cavities, and to such end is provided with a rearwardly projecting hand lever 5, on which is a knocker or hammer head 6, which as the mold is tilted to a forward position, is adapted to strike upon an anvil lug 7 on the forward portion of the base 1, to forcibly jar the molded material downwardly from said mold member in a rapid and certain manner. Such material is preferably received upon the forward portion of the base 1, and which for such purpose is provided with raised margins as shown to constitute a holding tray.

8 is the upper mold member provided with a rearwardly extending arm 9 by which it is pivotally connected to the pivot standard 10 on the rear portion of the base 1. With such construction the upper mold member is adapted to be swung upwardly and backwardly into the position indicated in dotted lines in Fig. 1.

11 is an operating hand lever preferably of a yoke form and pivoted by means of pivot hubs 12, and a pivot rod 14 to pivot lugs 13 on the upper surface of the aforesaid upper mold member 8, as shown.

15 are lugs or projections on the aforesaid hubs 12, adapted to have bearing upon the top surface of the mold 8, to provide a fixed connection between the operating hand lever 11 and the mold member 8 in the operation of tilting said mold member into the position above referred to and shown in dotted lines in Fig. 1.

16 is a spring encircling the aforesaid pivot rod 14 and having one end attached to said rod, and the other end to the hub of the operating hand lever 11. The tendency of said spring is to yieldingly maintain the hand lever 11 in fixed relation to the mold member 8 in its movement from a position superimposed above the lower mold member 2, into the open position shown in dotted lines in Fig. 1, and vice-versa.

17 is a pin or stud secured eccentrically on each hub 12, aforesaid, and adapted to effect the final and powerful closing of the mold members as hereinafter set forth.

18 are vertical fulcrum plates secured to the ends of the base 1, and formed at their upper ends with forwardly overhanging hook shaped projections 19 arranged in the path of the aforesaid eccentric pins 17 and adapted to provide fulcrum bearings for the same in the pressing operation of the mechanism.

In the present construction the upper and lower mold members 2 and 8 will be of a substantially counterpart construction, and will consist of elongated pieces, the opposed faces of which are formed with the respective halves of the series of mold cavities 20, and between each pair of mold cavities with opposed transverse severing ridges 21 which meet, or nearly meet, in the strip of candy material to separate, or nearly separate, the same into a series of the required size.

The operation of the machine is as follows: The lower mold member 2, is placed in the position illustrated in full lines in Figs. 1 and 2, and the upper mold member 8 tilted back into the position shown in dotted lines in Fig. 1. A strip of candy material is then laid on top of the lower mold section 2, after which the upper mold member 8, is drawn down upon the same by means of its operating lever 11, a final depression of which brings the eccentric pins 17 into bearing beneath the overhanging projections 19, to effect a powerful final closing movement of the upper mold member to complete the pressing or molding operation of the machine. The upper mold member is then returned to the position first described, after which the lower mold member 2, by means of its hand lever 5, is tilted forward, and by impact against the anvil 7 has the molded candy discharged down onto the forward web of the base 1.

With the construction of the mold members 2 and 8, heretofore described, the transverse ridges 21 between the series of mold cavities 20, are adapted to score or sever the strip of candy material into separate pieces of the required molded form, and surrounded with a rectangular marginal fin as shown in Fig. 3, to afford a very symmetrical appearance to the finished candy article or bonbon.

Having thus fully described my said invention what I claim as new and desire to secure by Letters Patent, is:—

1. In a candy machine, the combination of a stationary base, a lower mold member hinged at its forward side to said base, a hand lever connected to said mold member, an anvil lug arranged on said base in the path of said lever, an upper mold member hinged at its rear side to said base, an operating lever connected to said upper mold member, and an intermediate mechanism between said lever and the base for imparting final movement to the upper mold member, substantially as set forth.

2. In a candy machine, the combination of a stationary base, a lower mold member hinged at its forward side to said base, a hand lever connected to said mold member, an anvil lug arranged on said base in the path of said lever, an upper mold member hinged at its rear side to said base, an operating lever pivoted to said upper mold member and provided with a hub extension adapted for bearing upon the top of said mold member, a spring for yieldingly holding said extension to its bearing, and an intermediate mechanism between said lever and the base for imparting final movement to the upper mold member, substantially as set forth.

3. In a candy machine, the combination of a stationary base, a lower mold member hinged at its forward side to said base, a hand lever connected to said mold member, an anvil lug arranged on said base in the path of said lever, an upper mold member hinged at its rear side to said base, an operating lever connected to said upper mold member, and an intermediate mechanism between said lever and the base for imparting final movement to the upper mold member, the same comprising an eccentric pin on the hub of said lever, and a hook shaped fulcrum plate attached to the base, substantially as set forth.

4. In a candy machine, the combination of a stationary base, a lower mold member hinged at its forward side to said base, a hand lever connected to said mold member, an anvil lug arranged on said base in the path of said lever, an upper mold member hinged at its rear side to said base, an operating lever pivoted to said upper mold member and provided with a hub extension adapted for bearing upon the top of said mold member, a spring for yieldingly holding said extension to its bearing, an eccentric pin on the hub of said lever, and a hook shaped fulcrum plate attached to the base, substantially as set forth.

Signed at Chicago, Illinois, this 27th day of August, 1909.

GEORGE F. DICKSON.

Witnesses:
ROBERT BURNS,
HENRY MOE.